F. H. KNAPP & H. G. DEWEY.
CAN LABELING MACHINE.
APPLICATION FILED FEB. 5, 1916.

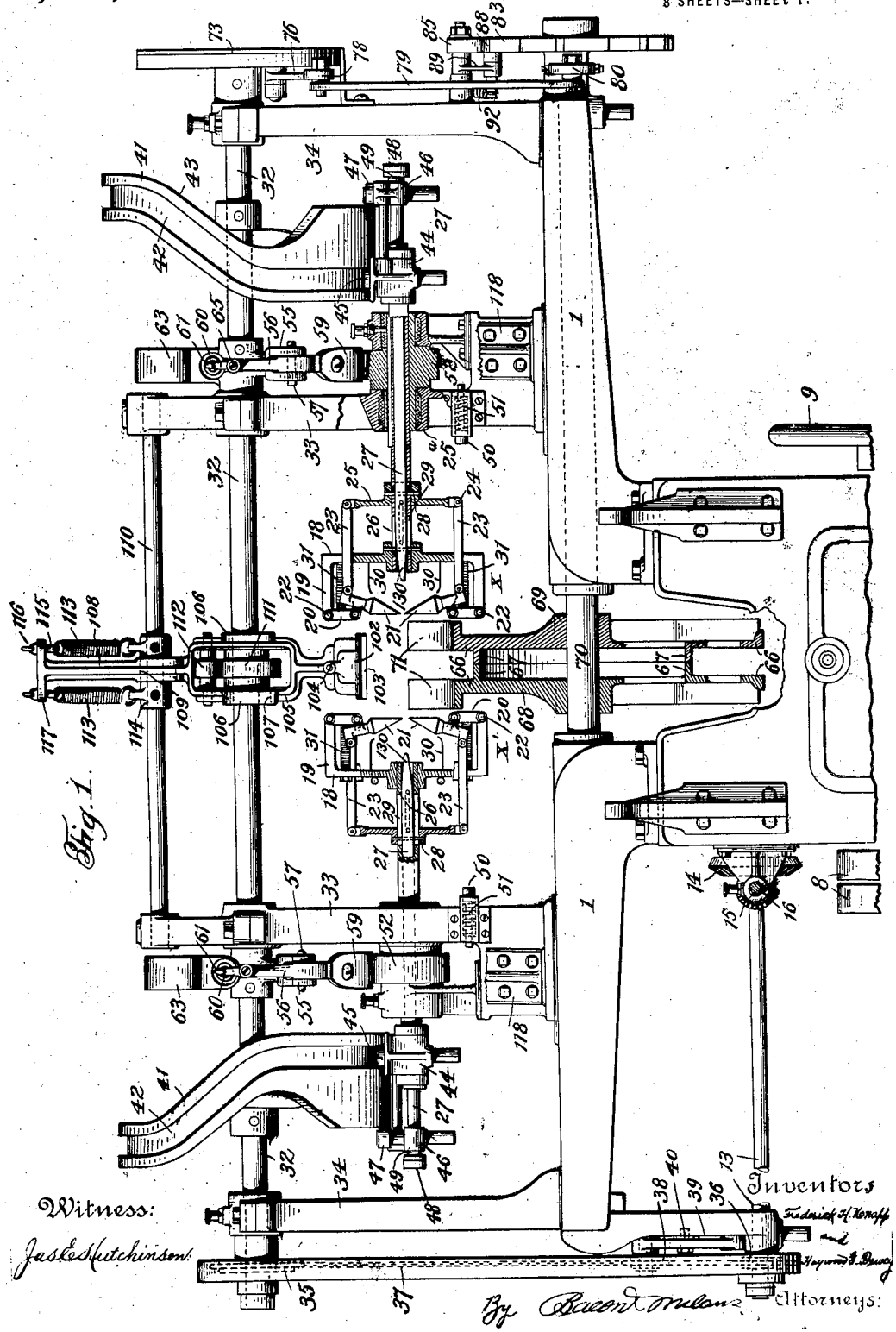

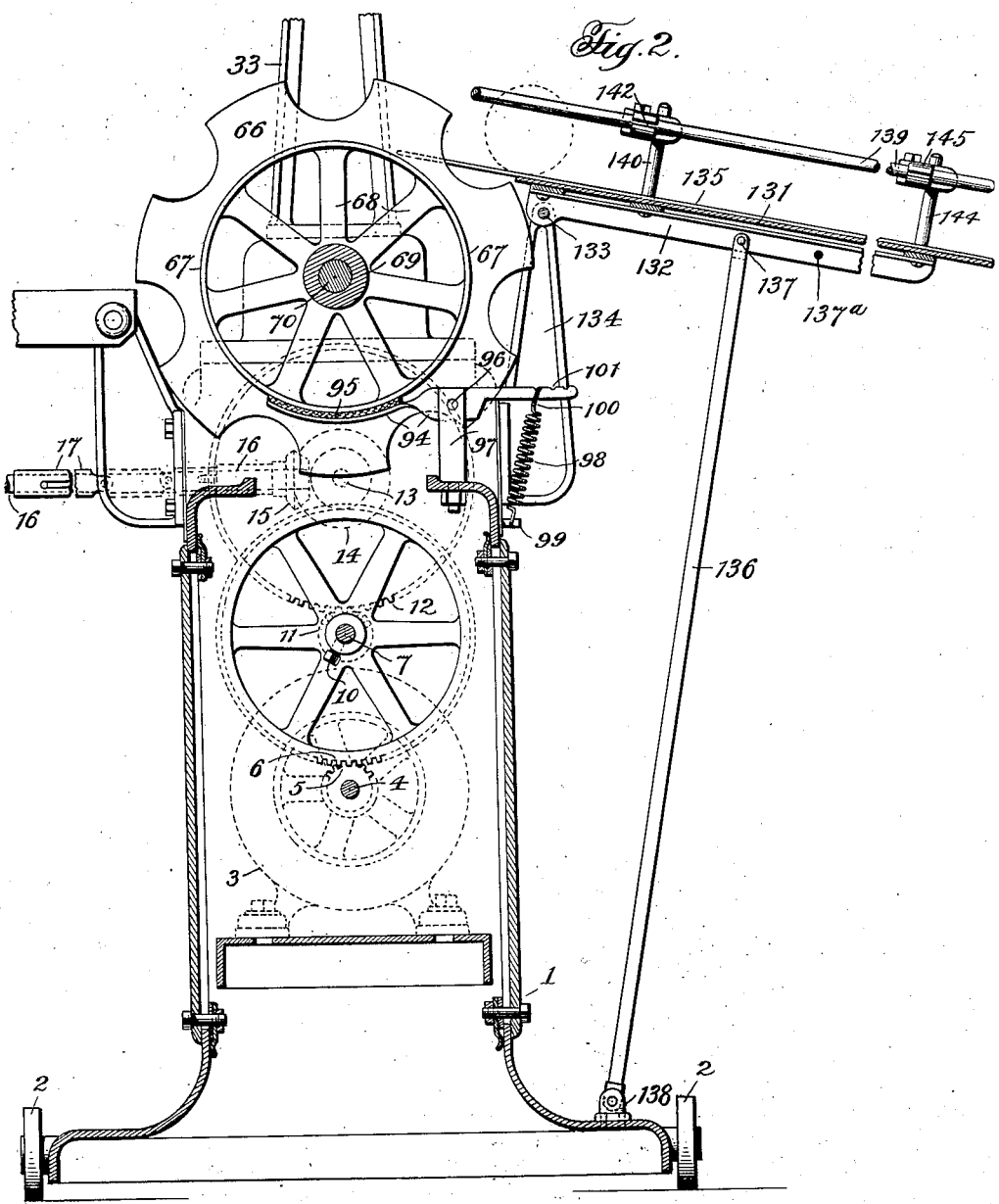

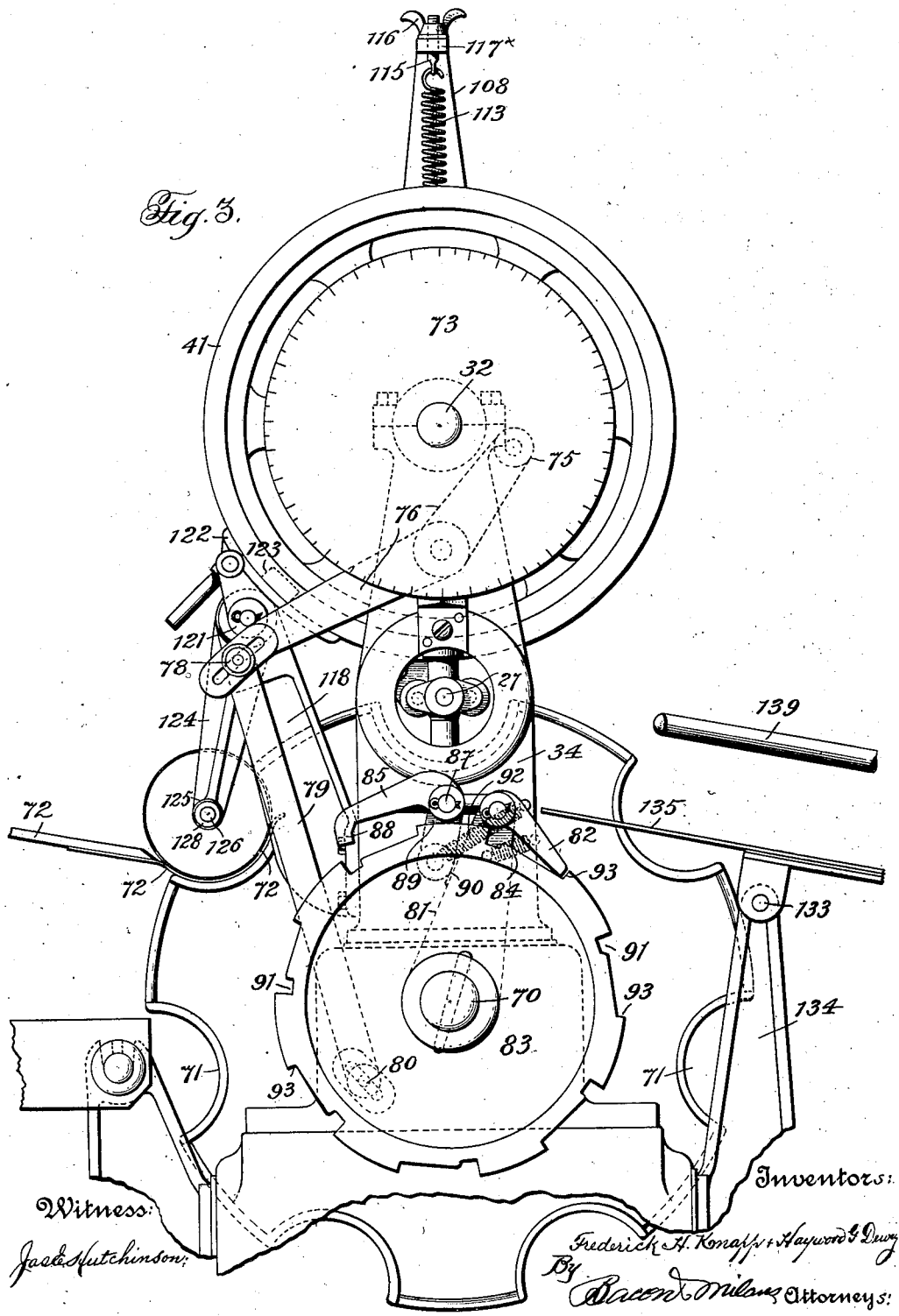

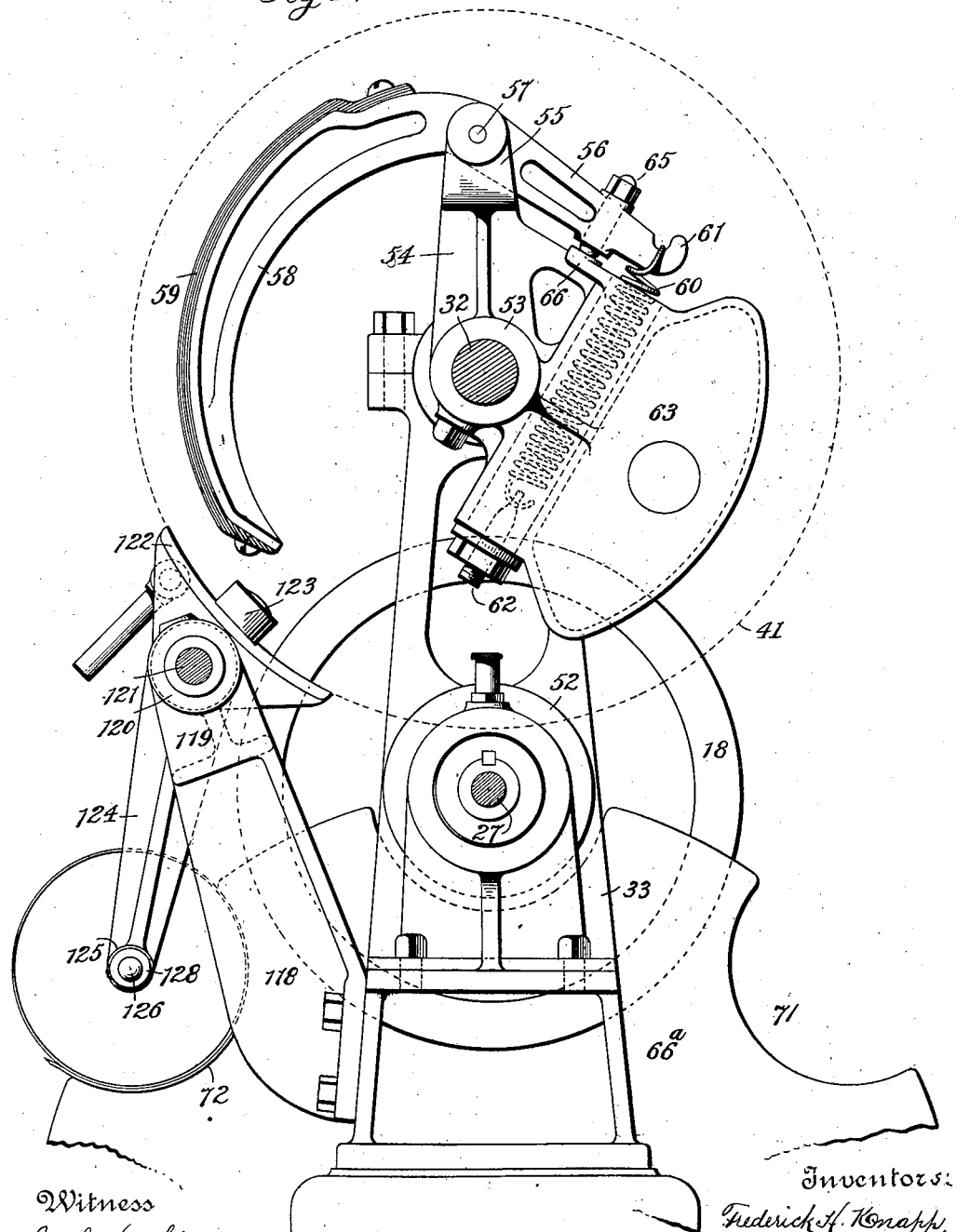

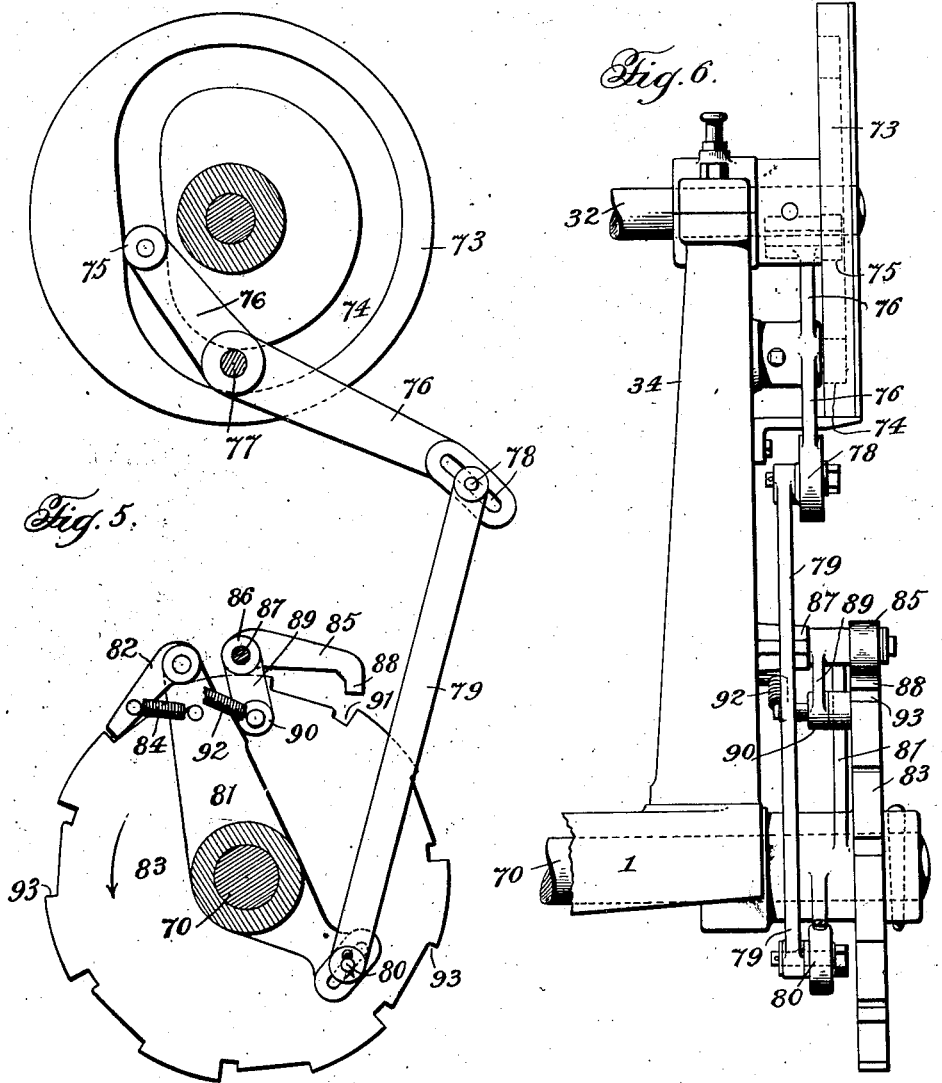

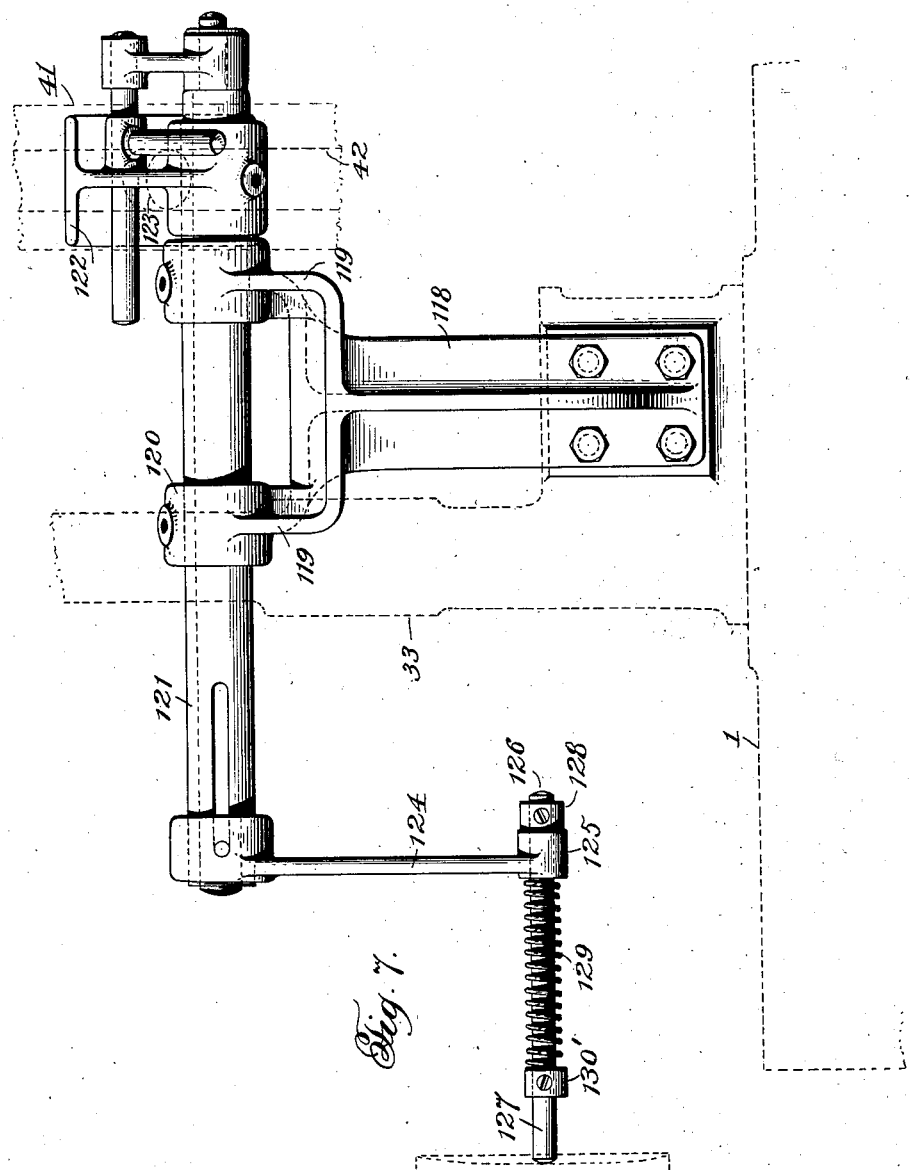

1,282,700.

Patented Oct. 22, 1918.
8 SHEETS—SHEET 7.

Witness:
Jas. E. Hutchinson

Inventors:
Frederick H. Knapp & Haywood G. Dewey
By Bacon & Milans, Attorneys.

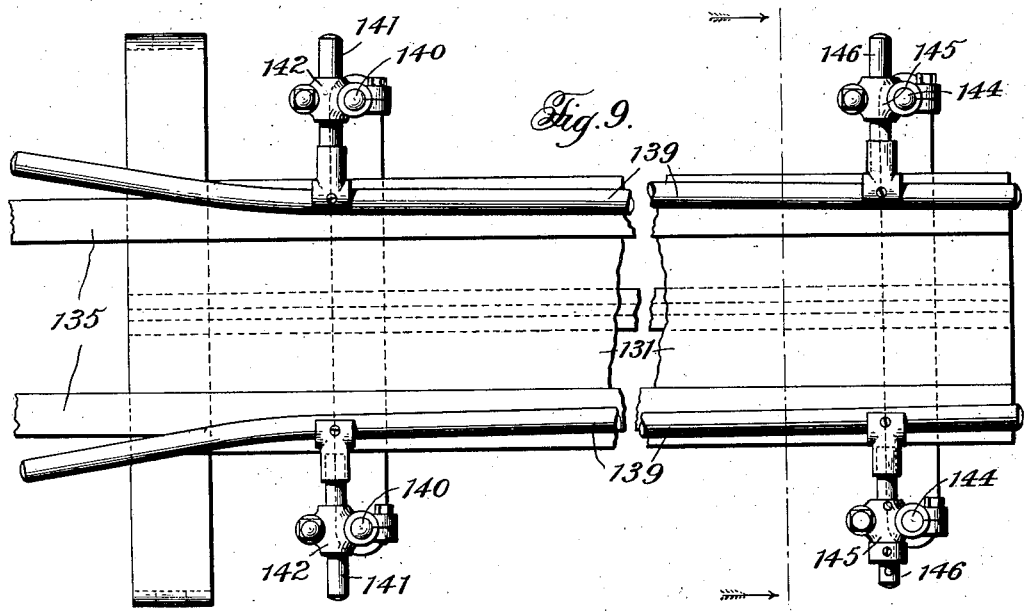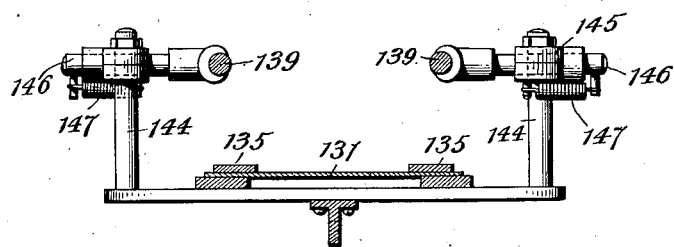

UNITED STATES PATENT OFFICE.

FREDERICK H. KNAPP, OF BALTIMORE, AND HAYWOOD G. DEWEY, OF WESTMINSTER, MARYLAND, ASSIGNORS TO FRED. H. KNAPP COMPANY, OF WESTMINSTER, MARYLAND, A CORPORATION OF MARYLAND.

CAN-LABELING MACHINE.

1,282,700.  Specification of Letters Patent.  Patented Oct. 22, 1918.

Application filed February 5, 1916. Serial No. 76,436.

*To all whom it may concern:*

Be it known that we, FREDERICK H. KNAPP, a citizen of the United States, residing at Baltimore, in the State of Maryland, and HAYWOOD G. DEWEY, a citizen of the United States, residing at Westminster, in the county of Carroll and State of Maryland, have invented certain new and useful Improvements in Can-Labeling Machines, of which the following is a specification, reference being had therein to the accompanying drawing.

This invention relates to can wrapping machines of a character adapted to neatly fold projecting edges of a label over the ends of a can whereby said folded portions constitute with that portion of the label applied to the periphery of the can a substantially complete wrapper therefor.

The wrapping machine herein contemplated is of the general type illustrated and described in the pending application for Letters-Patent of Knapp and Dewey filed February 13, 1915, Ser. No. 8078, and entitled Can wrapping machine, in which application the machine illustrated therein is designed more particularly to have considerable capacity, to the end that great numbers of cans may be wrapped in a short interval of time, and while machines of this type have gone into extensive use with entirely satisfactory results, it is one of the primary objects of the present invention to preserve the advantages of many of the salient characteristics of the said machine, but at the same time to provide a simplified construction of reduced capacity and of less expense, for the more especial use of those whose output does not warrant the more expensive machine of increased capacity.

One of the features of the present invention embodies a novel type of conveyer or transfer means for the cans adapted to deliver the same to the folding mechanism, and novel driving mechanism for said conveyer, to the end that the cans will be accurately positioned relative to the folding mechanism and maintained in this position during the folding operation, the driving mechanism for the conveyer being intermittently operable and accurately timed.

More particularly, the conveyer includes a rotatable reel having a plurality of can receiving parts at the periphery thereof and means for periodically actuating the reel whereby to successively register the cans mounted on the reel with the folding mechanism, the movement of the reel being automatically interrupted when the cans are properly registered, and in this connection, novel braking mans is properly provided in operative association with the reel to prevent continued movement thereof after having reached can registering position.

It is also contemplated by the invention to provide novel centering means for the cans, adapted to engage the cans positioned on the reel and properly position the same relative to the reel prior to the positioning of said centered can in operative relation to the folding mechanism.

Again it is proposed by the present invention to provide coöperating folding heads adapted to engage opposite projecting edges of the label and fold the same over the ends of the can, said folding heads having operatively connected therewith auxiliary centering devices to insure proper positioning of the can immediately prior to the actuation of the folding mechanism.

The invention further includes automatically operable clamping or pressing means to engage the periphery of the can when in position to be engaged by the folding heads, said means being releasable after the folding operation is completed, whereby the wrapped can is free to move in the continued movement of the conveyer.

Another object of the invention is to provide novel and efficient means for rotating the folding mechanism while in contact with the folded projected edges of the labels, whereby to iron the same and cause the folds of the label to assume a position flat against the ends of the can.

Another feature of the invention includes novel means for delivering the wrapped cans from the folding mechanism, said means having associated therewith means engaging the folded edges of the label to insure the maintenance of the folds and further crease the same as the cans are delivered from the machine.

Again the invention has in contemplation novel and efficient driving mechanism for the respective movable parts, all the various parts being preferably operable by and actuated from a common source of power, and the operation of each movable part being accurately timed with respect to the other movable parts.

Finally the invention contemplates a machine of the character described, comparatively simple in design and construction, compact, relatively inexpensive, and at the same time highly efficient in operation, and strong and durable in use.

Many other and further improvements and novel details in the construction and arrangement of parts will be appreciated from the description to follow, it being understood in this connection that many minor changes may be made in the various details, without departing from the spirit of the invention.

In the description and accompanying claims, while the term "can" or "cans" may be employed for convenience as the article to be labeled or wrapped, it is to be understood that this term is a general one and includes within its contemplation any other article, carton or package of a character to be successfully wrapped by the mechanism employed.

The description is to be considered in connection with the accompanying drawings which form a part hereof, and wherein is disclosed for the purpose of illustration, a convenient and satisfactory embodiment of the invention.

In the drawings:—

Figure 1 is a front elevation partly in section of the machine.

Fig. 2 is a vertical section of the machine.

Fig. 3 is an end elevation enlarged.

Fig. 4 is an enlarged detail view of a friction driving means and associated parts for rotating the folding heads.

Figs. 5, 6, and 7 are detail views of a driving means for the can conveyer or transfer means.

Figure 8:
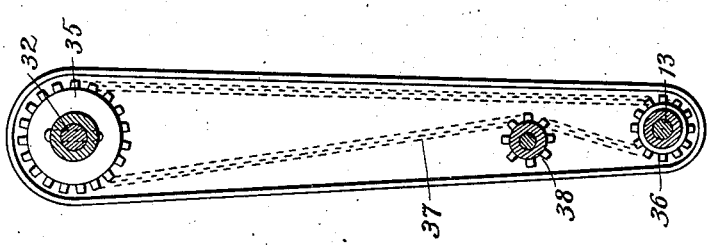

Fig. 8 is a detail view of one of the driving connections between the movable parts.

Fig. 9 is a top plan view of the discharge end of the machine, illustrating more particularly a delivery runway and means for engaging the wrapped ends of the cans to further compress and maintain the folds at said ends, and Fig. 10 is a section of the same.

Figure 11:
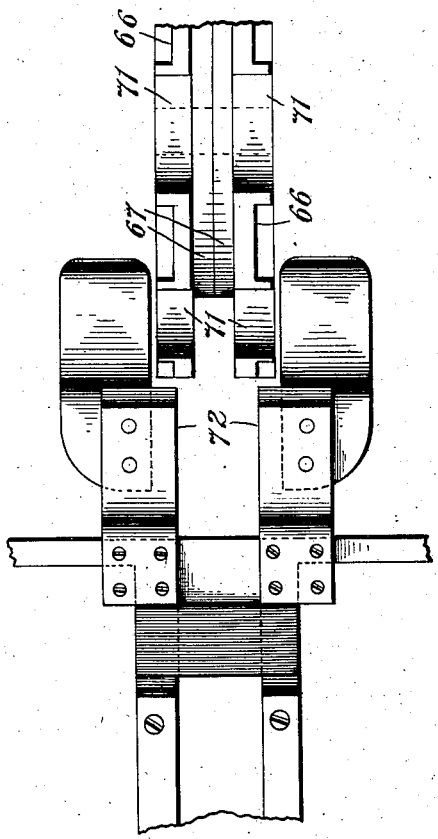

Fig. 11 is a top plan of the carrier reel and associated parts.

With more particular reference to the drawings, wherein like reference numerals refer to corresponding parts throughout the several views, 1 is a suitable framework preferably mounted upon rollers 2, whereby the machine may be transported from place to place. It is to be understood that the machine herein more particularly described is adapted primarily to fold projecting edges of labels over the ends of the cans, it being understood that the labels are previously applied to the cans by means of mechanism, not necessary to illustrate in detail herein, in view of the fact that the labeling mechanism per se constitutes the subject-matter of a divisional application filed concurrently herewith. In said divisional application is illustrated the wrapping mechanism of the present invention and its operative association and connection with the labeling mechanism forming the basis of such application.

Positioned on the framework of the machine, is a suitable motor 3 having a shaft 4 upon which is mounted a pinion 5 adapted to mesh with a gear wheel 6 mounted upon a shaft 7 supported in suitable bearings on the frame work and having connected at one end thereof suitable pulleys 8 and at the opposite end thereof a suitable hand wheel 9. The gear wheel 6 is adapted to slide along the shaft 7 or out of engagement with the pinion 5 as desired, whereby the shaft 7 may be directly driven either by the hand wheel 9 or suitable power driven belts not illustrated, but adapted to engage the pulleys 8. By reason of the construction just described, it will be observed that the machine is of a character to be driven according to the desire of the operator either by the motor directly mounted on the framework, conveniently an electric motor, or by the belt drive, or even at times manually through the medium of the hand wheel 9. Assuming that it is desired to impart movement to the shaft 7 through the medium of the motor 3, the gear wheel 6 will be fixed on the shaft in registration with the pinion 5 by means of a suitable releasable bolt 10 or other retaining means. Fixed on the shaft 7 is a suitable pinion 11 adapted to mesh with a gear wheel 12 mounted upon a rotatable shaft 13 having a suitable bevel gear 14 adapted to mesh with a bevel gear 15 mounted upon a shaft 16, which latter, through the medium of a detachable coupling member 17 of any desired construction is adapted to be coupled with drive shaft of the labeling machine, as illustrated more particularly in the divisional application filed herewith.

The folding heads are generally indicated by the reference characters X and X', two being employed whereby to simultaneously engage and fold projecting edges of the labels over the respective ends of the can, and as these heads are similar in construction, a description of one will suffice for the other. 18 is an annular disk having projecting therefrom, suitable supporting arms 19 to which are pivoted as by hangers 20 suitable rotatable folding fingers 21 pivotally connected to elongated arms 23 connected at the rear ends thereof at 24 to a suitable disk member 25. The member 18 is fixed to a suitable sleeve 26 for slidable and rotatable movement therewith, whereas the member 25 is fixed to a shaft 27 which projects through the sleeve 26, and is secured as by means of pins 28 passing through slotted ways 29 in the sleeve 26 and secured to the shaft 27. Suitable spring fingers 30 are carried by the members 18 to coöperate with the fingers 21 in the folding operation, and suitable spiral springs 31 engage respectively the links or hangers 20 and an offset rear end of the arms 19. The folding heads as thus far described, are, in material respects similar to the folding heads as illustrated and described in detail in the patent to Knapp and Leister, No. 1135294, and the co-pending application of Knapp and Dewey, Ser. No. 8078, filed February 13, 1915, and it is not necessary to describe in detail the function and operation of these parts herein. A longitudinally extending shaft 32 overlies the folding heads, being supported by suitable uprights 33 and 34 on the main supporting frame. Arranged upon one end of the shaft 32 is a suitable sprocket wheel 35 and positioned upon the shaft 13 is a similar sprocket wheel of reduced diameter 36, the said wheels being adapted to receive a sprocket chain 37, whereby the shaft 32 is rotated. A suitable chain tightener 38 mounted upon a swinging bracket 39 having a bolt and slot engagement 40 with the framework may be provided whereby to take up any unnecessary play in the chain. 41 are suitable cam members fixed upon the shaft 32, the said members having a peripheral cam groove 42 and an edge cam surface 43. Fixed upon the sleeves 26 as by brackets 44 are suitable roller bearings 45 adapted to engage the peripheral cam grooves 42 and sleeved upon the end of the shafts 27 are suitable bracket supports 46 carrying a roller bearing 47 to engage the side cam surfaces 43. Interposed between the bracket supports 46 and end abutments 48 at the end of the shafts 27 are suitable spring 49, whereby to exert inward pressure on the bracket supports 46 to insure engagement of the roller bearings 47 with the cam surface 43.

From the description thus far it will be observed that as the shaft 13 is rotated, the shaft 32 is in turn rotated through the medium of the chain 37 and the cam members 41 are continuously rotated.

Assuming that the folding heads are in retracted position, the disk members 25 are in contact with the abutments 25ª of the uprights 33 and the folding fingers 21 are in retracted position. The continued rotation of the cam members 42 by engaging the rollers 45, will exert inward movement to the sleeves 26 and when the inward limit of movement is reached, the cam surfaces 43 will exert outward pressure on the roller bearings 47, thereby forcing the members 26 outwardly, which in turn swings the folding fingers 21 into flat engagement or contact with the edges of the labels which have been folded over the edges of the can by said fingers 21 and coöperating spring fingers 30. Thereupon, the heads are rotated with said fingers 21 in contact with the folded edges of the wrapper, by means to be presently described, and when rotation is complete the cam surfaces 21 by continued engagement with the rollers 45, will draw the sleeve 29 and parts connected therewith outwardly until the hub or boss of the member 25 again contacts with the abutment 25ª which will cause the stoppage of the member 25 and continued sliding movement of the member 18, thereby retracting the fingers 21 as will be obvious. Suitable yieldable abutments 50 spring held as at 51 in sockets in the framework are adapted to be contacted by the members 18, as the latter reach the limit of outward movement.

The means for rotating the folding heads is preferably of substantially the following construction:—

Mounted upon the sleeve 26 for rotatable movement therewith is a suitable collar 52 adapted to be intermittently engaged by a friction drive mechanism conveniently made up as follows:—Positioned upon the shaft 32 for rotatable movement therewith is a suitable boss 53 having an arm extension or bracket part 54 having a bifurcated terminal 55 adapted for the reception of an elongated arm 56 pivoted to said bifurcated terminal as by means of a pintle 57. The arm 55 has a segmental elongated extension 58 having secured to the outer surface thereof a friction pad or the like 59, the said parts being so arranged to in the rotatable movement of the shaft 32 engage the collar 52 to impart rotatable movement thereto. In order to constantly exert outward pressure on the friction shoe 58 to maintain driving contact of the latter with the collar 52, a suitable spring 60 is provided, the said spring being secured at one end to an offset part 61 of the arm 56 and at its opposite end to a bolt 62. The spring and bolt are arranged within an aperture extending through an integral projection of the boss 53 which projection 63 is weighted and constitutes in effect a counterbalance for the friction shoe and parts carried thereby. A nut threaded to the terminal of the bolt 62 and engaging one edge of the projection 63 constitutes means for adjusting the tension of the spring 62, and thereby regulate the engagement of the friction shoe with the collar 52. A suitable bolt or the like 65 adjustably mounted in the arm 56 and adapted to engage an abutment 66 affords means for limiting the outward movement of the friction shoe 58 under the action of the spring 60. It will be observed that the parts are so arranged and timed that when the shaft 27 has been moved to contact the folding fingers 21 with the ends of the can, the free end of the friction shoe 58 will contact with the collar 52 thereby rotating the sleeve 26 and shaft 27 together with the folding fingers to thereby crease the end folds of the wrapper as formed by the folding mechanism. Thereafter, the shoe 58 moves out of contact with the collar and the cam member 41 operates to retract the folding heads. While the shoes 58 are in contact with the collar whereby to rotate the heads, it will be observed that the rollers 45 and 47 are in engagement with a straight portion of the coöperating cam surfaces to the end that no longitudinal movement of the heads will at this time take place.

A preferred can transfer or conveyer mechanism will now be described. A rotatable reel or carrier member conveniently comprising opposed disks 66 having abutting annular flanges 67 is provided, said disks having spokes 68 connecting with hubs 69 secured to a shaft 70 for rotatable movement therewith. The reel is intermittently actuated by means to be presently described and has about the periphery thereof, a plurality of segmental recesses or pockets 71 shaped to conform to the periphery of a can and adapted to project over a substantial portion of said can periphery. The conveyer member is designed to move between the folding heads X and X' and also to move between coöperating members 72 of a discharge runway leading from label applying and fixing mechanism which attaches to the periphery of the can a label with edges projecting beyond the same. The said members 72 have at the terminal thereof segmental depressed portions forming a receiving pocket for the can, and the reel in its movement between the members 72 will bring a recessed portion 71 thereof in direct position to engage and pick up a can deposited in the depressed portion or pocket of the runway members 72.

A suitable intermittent drive for the can conveyer or transfer mechanism includes a rotatable disk 73 secured to the shaft 32 for movement therewith, the said member 73 having upon one surface thereof a cam-groove 74 adapted to be engaged by a roller 75 positioned at the end of a lever 76 pivoted intermediate its ends as by a pintle 77 to one of the upright members 34. The lever 76 at its free end has a pin and slot connection 78 with an elongated connecting arm or link 79 which latter is pivoted at its opposite end as by a pintle 80 with one end of a rock arm 81 sleeved upon the shaft 70. The rock arm has at its free opposite end a pivoted actuating dog 82 adapted to engage the periphery of a disk 83 which said disk is fixed upon for movement with the shaft 70. A spring 84 connected at one end to the dog 82 and at its opposite end to the arm 81 tends to normally retain the dog in engagement with the periphery of the disk 83. A suitable locking dog 85 is pivoted at 86 to a suitable stud 87 projecting outwardly from the support 34, the said locking dog being also adapted to engage the periphery of the disk 83 and having an offset locking lug 88. An offset projection 89 of the dog 85 has a suitable roller bearing 90 to be engaged by the rocker arm 81 in its movement and thereby lift the locking lug 88 out of engagement with the locking notches 91, a spring member 92 being provided for normally maintaining the dog 85 in locking position, the said spring being connected at one end to the offset part 89 of the locking dog and at its opposite end to the support 34. The actuating dog 82 is adapted to impart movement to the disk 83 by engaging the notched portions or teeth 93 of the disk.

Assuming that the folding operation of the heads X—X' is completed and they are retracted, the parts just described will be in substantially the position illustrated in Fig. 5 at which time the dog 82 is in engagement with the notch 93 of the disk 83, and the movement imparted to the lever 76 and link 79 through the medium of the cam engaged roller 75 will rotate the disk in the direction of the arrow (Fig. 5), a sufficient distance, whereby to register the labeled can in the succeeding pocket 71 of the reel in position to have the projecting edges of the label folded against the ends of the can. When the can is in this position, the disk 83 is in position to permit the locking lug 88 to register with the notch 91 thereby locking the disk 83 from further rotation. The continued rotation of the cam member 73 will cause the rock arm 81 to move in a reverse direction to the arrow, and as the folding heads X—X' are retracted, the rock arm 81 engages the roller 90 when the locking dog moves thereby disengaging the locking lug 88 from the notch 91 at which time, the dog 82 will fall into engagement with a succeeding notch or tooth 93, whereupon the folding heads X—X' having been retracted, the cam 74 will cause the roller 75 to once more impart rocking movement to the arm 81 thereby rotating the disk in the direction of the arrow as previously described.

Suitable braking means may be employed in operative association with the conveyer or reel whereby to prevent any overrun of the reel after the same has been moved into position to register the can with the folding mechanism. The braking mechanism in the embodiment of the invention illustrated, comprises a segmental shoe 94 having a friction surface 95 to engage the annular flange 67. The member 94 is pivoted intermediate its ends as by a pintle 96 to a projection 97 on the supporting frame and a spring member 98 connected at 99 to said supporting frame and having an eye 100 at its opposite end adapted to engage over the free end of the member 94, is adapted to exert constant spring pressure on the member 94 whereby the shoe will afford a constant drag or restraining medium for the reel, to prevent rotation thereof except when positively rotated by the actuating dog 82 and associated parts. The free end of the member 95 is preferably notched as indicated at 101, whereby the tension of the spring may be adjusted by engaging the eye 100 thereof, with the different notches 101.

Suitable holding or clamping means for the cans when in position to be acted upon by the folding heads X—X' preferably includes a segmental presser foot 102 having a yieldable surface 103 adapted to engage the periphery of the can intermediate its ends. Said presser foot is loosely supported for a slight rocking movement as by a pintle 104 upon a bifurcated bracket member 105 the opposite arms of which have bosses 106 with elongated vertically disposed slots 107 sleeved upon the shaft 32. The arms 105 connect at the top with a vertical extension 108 having a vertically slotted portion 109 sleeved upon a suitable supporting rod 110 projecting between the supports 33. Positioned on the shaft 32 for rotatable movement therewith is a cam disk 111 arranged between the arms 105 on the supporting bracket and adapted to engage a roller 112 having bearings in said arms 105, whereby to impart vertical movement to the presser foot or clamp proper. Spring members 113 secured at their lower ends to members 114 mounted on the support 110 and at their opposite ends to bolts 115 adjustably mounted as by nuts 116 upon a T-shaped head 117 of the supporting bracket tends to exert downward pressure on the bracket and the presser foot or clamp, when downward movement of the latter is permitted by the reduced portion of the cam 111 coming in contact with the roller 112 carried by said bracket. The parts just described are so timed that when the folding heads X—X' are in retracted position, an elevated portion of the cam in engagement with the roller 112 will maintain the presser foot or clamp out of the path of the can carrying reel. As the folding heads are moved inwardly, so also is the presser foot moved downwardly, and just prior to the movement of the folding fingers 21 into contact with the can heads, the presser foot or clamp will have reached the limit of its downward movement, thereby firmly clamping the can in fixed position relative to the peripheral retaining pocket of the reel which, at this time is stationary. The presser foot or clamp will be maintained in clamping position until after the rotation of the folded heads X—X' is completed and the retractive movement of the heads commences, when the presser foot will be elevated.

Means for properly centering the cans prior to the folding action of the heads is provided in operative association with the reel, and will now be referred to.

A pair of centering devices is provided, one to engage each end of the can, and a description of one will answer for the other, the same being duplicates. A bracket support 118 is mounted in any desired manner to the framework of the machine at the front thereof, said support having at the top thereof spaced arms 119 terminating in apertured lugs 120 adapted to receive a reciprocating shaft 121. The shaft 121 has secured thereto a suitable shoe 122 adapted to engage the periphery of the cam member 41, and said shoe having connected therewith a roller member 123 adapted to engage the cam groove 42 heretofore described. Mounted upon the end of the shaft 121 is a downwardly projecting arm 124 having an apertured boss 125 at the lower end thereof adapted to loosely receive a shaft 126 terminating at its inner end in a centering device 127 to engage the end of the can at substantially the center thereof. A suitable nut 128 limits the inward movement of the centering devices, and a suitable spring 129 interposed between a lug 130' fixed on the shaft 127 and at its opposite end to the boss 125 tends to normally retain the centering device with the abutment 128 in contact with the boss, said spring however affording sufficient yieldability to the centering devices to accommodate for any irregularity in the size of the cans. The centering devices 127 are adapted to engage the can in that pocket immediately succeeding the pocket which supports the can the projecting edges of the label on which are being folded, and the construction of the cam 42 is such that the centering devices reach the inward limit of movement while the carrying reel 66—66 is in stationary position. Auxiliary centering means may be provided to further center the can just prior to the folding operation of the fingers 21, this auxiliary centering means preferably taking the form of pointed extensions 130 on the shafts 27. When the folding heads X—X' are in retracted position, the members 18 and 25 are substantially in contact and the centering devices 130 project to a point in substantial alinement with the outer ends of the lugs 19, which position the centering devices 130 maintain until they contact with opposite ends of the can, thereby accurately seating and centering the same in the pocket 71 of the carrying reel. The folding fingers 21 are at this time in retracted position, and so soon as the members 130 are centered by the centering devices 130 the presser foot or clamp 102 will immediately clamp the can in the properly centered position. Thereupon, the cam roller 37 by engaging a projecting portion of the cam surface 43 will impart outward movement to the shaft 27, thereby moving the centering devices 130 out of the path of the folding fingers which in the continued outward movement of the shafts 27 will be forced into folding engagement with the projecting edges of the label by the outward movement of the members 25.

The can discharge means preferably takes the form of an elongated runway 131 having suitable downwardly projecting arms 132 loosely supported at 133 upon a transverse bar mounted upon supporting brackets 134 projecting from the framework of the machine at the rear thereof. The runway 131 has a cut-out portion conveniently formed by projecting side bars 135 adapted to overlie opposed sides of the carrier reel 66—66 to the end that the cans will fall out of the pockets 71 of the reel directly on to the main portion of the runway, which connects with said side extensions 135. The runway is supported intermediate its ends as by an upright bar 136 pivoted at 137 to the runway and pivoted at its lower end to a lug 138 mounted upon the base of the frame 1. The connection 137 includes a pintle carried by the bar 136 adapted to engage any one of a series of engaging recesses 137ª, whereby the connection between the bar 136 and the runway may be adjusted, and whereby the inclination of the runway may be varied at will. Suitable guide bars for the ends of the wrapped can are provided, said guide bars being illustrated at 139, the same preferably inclining outwardly toward that end of the runway adapted to receive the cans from the carrier reel 66—66. The guide bars 139 are supported adjacent this end of the runway as by means of suitable brackets 140 having at the top thereof apertured lugs 141 adapted to receive a laterally projecting pintle 142 secured to the bars 139. The pintle 142 after being properly adjusted relative to the apertured lug, according to the size of the can is held in fixed position by suitable bolts or the like. The guide arms or bars 139 gradually taper toward one another, toward the free or outer end thereof, and are yieldably supported, whereby to give laterally by means of suitable supporting arms 144 having at the top thereof, an apertured lug 145 adapted to receive a pintle 146 projecting from the bar 139. The engagement between the pintle 146 and lug 145 is a loose one, a suitable spring 147 being provided, secured at one end to the pintle 146 and at its opposite end to the lug, tending to normally force the bars inwardly. The bars are spaced upwardly from the runway a sufficient distance to engage the cans at a point to one side of the center thereof, and because of the fact that the bars adjacent the discharge end of the runway yieldably engage the folded edges on the wrapper at the ends of the can, the folded edges of the wrapper will be maintained in folded condition and further creased or ironed into snug contact with the ends of the can.

The operation may be reviewed as follows:—

The supporting frame for the folding mechanism having been properly registered with and coupled up with the means for applying and affixing to the cans a label, with the edges of the label projecting beyond the ends thereof, the shaft 13 is rotated, thereby imparting rotation to the shaft 32. The transfer or carrier reel 66—66 moving between the discharge end of the runway members 72 of the label applying mechanism by reason of its driving connection with the shaft 32, will pick up a labeled can from the retaining pocket at the discharge end of the labeling mechanism, when the centering devices 127 will be moved inwardly into contact with the can to center the same by reason of the engagement of the roller member 123 with the cam groove 42. Continued movement of a cam member 41 will cause the centering devices to move outwardly to thereby release the can, the carrier reel 66—66 being in stationary position during the centering operation. The continued movement of the carrier reel brings the can in position to be acted upon by the folding heads X—X′ when the rotatable movement of the reel is interrupted and maintained interrupted during the folding operation. Thereupon the folding heads are moved inwardly into folding position, but previous to the operation of the folding fingers 21 to fold the projecting edges of the wrapper, the auxiliary centering devices 130 engage the ends of the can and thereafter the clamp 102 is forced downwardly under spring pressure 113 into holding contact with the centered can. The shaft 27 by reason of the engagement of its roller 47 and the cam surface 43, when the heads are in folding position will be forced outwardly thereby moving the centering devices 130 outwardly together with the members 25 of the folding head which results in swinging the folding fingers inwardly into contact with the projecting edges of the label thereby completing the folding operation, the folds being creased by the rotatable movement of the heads due to the engagement of the friction shoes 58 with the collars 52. Upon the completion of the rotation of the folding heads X—X′, the presser foot or clamp 102 is elevated, the folding heads are retracted and the carrier reel has imparted thereto rotatable movement whereby to discharge the wrapped can on to the runway 131, the side bars 139 of which further creasing the folds and causing the same to snugly contact with the ends of the can.

What is claimed as new is:—

1. In a machine for applying labels to cans, the combination of means for supporting a can with a label applied thereto and one edge of the label projecting beyond the end of the can, a slidable and rotatable head having folding mechanism to engage and fold the projecting edge of the label over the end of the can, a drive shaft having at one end hand operating means and at its opposite end belt engaging means, a motor, gear mechanism interposed between said motor and the shaft intermediate the ends of the latter, means for rendering said gear mechanism inoperative to rotate the shaft, and means interposed between said shaft and the folding head whereby said shaft imparts slidable and rotatable movement to the head when operated through the medium of any of its operating means previously described.

2. In a machine for folding projecting edges of a label over the ends of a can, the combination of a supporting frame, opposed folding heads positioned on said frame, a can support positioned between said folding heads and periodically movable to position a can relative to the heads, folding mechanism mounted on the heads, a motor positioned on the frame, and operative drive connection between the motor and said folding heads and between the motor and the can support.

3. In a machine of the character described, having means for supporting a can with a label applied thereto and one edge of the label projecting beyond one end of the can, the combination of a rotatable head having folding fingers to engage and fold said projecting edge of the label over the end of the can, a stationary support, a rotatable shaft for the head mounted on said support, and friction drive means for said shaft.

4. In a machine of the character described, having means for supporting a can with a label applied thereto and one edge of the label projecting beyond one end of the can, the combination of a rotatable head having folding fingers to engage and fold said projecting edge of the label over the end of the can, a stationary support, a rotatable shaft for the head mounted on said support, friction drive means for said shaft including a collar on the shaft, and a movable friction member to engage the collar and rotate the shaft.

5. In a machine of the character described, having means for supporting a can with a label applied thereto and one edge of the label projecting beyond one end of the can, the combination of a rotatable head having folding fingers to engage and fold said projecting edge of the label over the end of the can, a stationary support, a rotatable shaft for moving the head mounted on said support, friction drive means for said shaft comprising a rotatable friction surface to engage a part carried by the shaft, and means for exerting pressure on said surface while in contact with said part.

6. In a machine of the character described, having means for supporting a can with a label applied thereto and one edge of the label projecting beyond one end of the can, the combination of a rotatable head having folding fingers to engage and fold said projecting edge of the label over the end of the can, a stationary support, a rotatable shaft for moving the head mounted on said support, and friction drive means for said shaft, comprising a movable friction shoe adapted to engage a part on the shaft under constant spring pressure.

7. In a machine of the character described, the combination of a rotatable folding head, a shaft support for the head, means for rotating the shaft comprising a rotatable friction shoe adapted to frictionally engage a part on the shaft, and means for intermittently moving said shoe into and out of contact with said part whereby the head is rotated intermittently.

8. In a machine of the character described, the combination of a rotatable folding head having means adapted in the rotation of the head to engage and fold projecting edges of a label over the end of a can, a shaft support for the head, and means for rotating the shaft comprising a rotatable friction shoe adapted to periodically frictionally engage a part on the shaft, said shoe comprising a segmental part free at one end and a movable support for said part.

9. In a machine of the character described, the combination of a rotatable folding head having means adapted in the rotation of the head to fold projecting edges of a label over the end of a can, a shaft support for the head, and means for rotating the shaft comprising a rotatable member adapted to periodically engage a part on the shaft, said member having a yieldable engaging surface of frictional material.

10. In a machine of the character described, the combination of a rotatable folding head having means acting in the rotation of the head to fold projecting edges of the label over the end of a can, a shaft support for the head, and means for rotating the shaft comprising a rotatable friction shoe adapted to intermittently frictionally engage a part on the shaft, said shoe comprising a segmental engaging surface and a counter-balance connected therewith.

11. In a machine of the character described, the combination of a support for a can, means for applying a label to the can with an edge of the label projecting beyond the end of the can, a rotatable folding head having means adapted in the rotation of the head to fold the projecting edges of the label over the end of the can, a shaft support therefor, having an annular enlargement, and yieldable means to engage said enlargement for rotating the shaft and head carried thereby comprising a segmental shoe pivotally supported intermediate its ends, said shoe being free at one end to engage said enlargement of the shaft, a yieldable support for the opposite end of the shoe, and a rotatable support for said shoe whereby the same is moved into and out of contact with said enlargement.

12. In a machine of the character described, the combination of a rotatable folding head, means for supporting a can with a label applied thereto with an edge of the label projecting beyond the edge of the can, a shaft support for the head, having an annular enlargement, and means to engage said enlargement for rotating the shaft and head carried thereby to fold said projecting edge of the label over the end of the can comprising a segmental shoe pivotally supported intermediate its ends, said shoe being free at one end to engage said enlargement of the shaft, a yieldable support for the opposite end of the shoe, a rotatable support for said shoe whereby the same is moved into and out of contact with said enlargement, and a weighted member in the space between opposite ends of the shoe and rotatable therewith.

13. In a machine of the character described, the combination of a carrier reel, means for rotating the reel, said reel having means for supporting a can with a label applied thereto and edges of the label projecting beyond the ends of the can, rotatable folding heads having folding mechanisms to engage said projecting edges of the label and fold the same against the ends of the can, a shaft carried by the heads, a fixed support for the shaft, means operatively associated with the shafts for reciprocating the heads into and out of operative position relative to said can support, means also associated with said shafts for rotating the heads when the folding mechanism is in operative position, means for interrupting the movement of the carrier reel, and movable means independent of and acting automatically to engage the can and hold the same against rotation during the rotatable movement of the heads.

14. In a machine of the character described, the combination of means for supporting a can with a label applied thereto and edges of the label projecting beyond the ends of the can, opposed heads having folding mechanism mounted thereon, adapted to fold said projecting edges in contact with the ends of the can, operating means for the heads and folding mechanism, and can centering means carried by the heads.

15. In a machine of the character described, the combination of means for supporting a can with a label applied thereto and edges of the label projecting beyond the ends of the can, opposed heads having folding mechanism mounted thereon adapted to fold said projecting edges in contact with the ends of the can, operating means for the heads and folding mechanism, and can centering means carried by the heads, comprising reciprocating pins adapted to engage the ends of the can adjacent the center thereof.

16. In a machine of the character described, the combination of opposed heads having folding mechanism for projecting edges of the label applied to a cam, a movable can carrier for positioning the can between said heads, and movable centering means carried by the heads and adapted to engage the can at its ends at a point within the projecting edges of the label.

17. In a machine of the character described, the combination of opposed heads having folding mechanism thereon to fold projecting edges of the label applied to a can, a can support arranged between the heads, said folding mechanism including a cluster of pivotally mounted folding fingers, and a centering device carried by each head at a point within the boundary of said fingers.

18. In a machine of the character described, the combination of opposed heads having folding mechanism thereon to fold projecting edges of the label applied to a can, a can support arranged between the heads, said folding mechanism including a cluster of pivotally mounted folding fingers, a centering device carried by each head at a point within the boundary of said fingers, and means for moving the folding fingers and centering devices in opposite directions whereby in the actuation of the folding fingers the centering devices will be out of the path thereof.

19. In a machine of the character described, the combination of opposed heads having folding mechanism thereon to fold projecting edges of the label applied to a can, a can support arranged between the heads, said folding mechanism including a cluster of pivotally mounted folding fingers, a centering device carried by each head at a point within the boundary of said fingers, means for moving the folding fingers and centering devices in opposite directions whereby in actuation of the folding fingers the centering devices will be out of the path thereof, and a presser member to engage the can and coöperate with said support to hold the can during the folding operation.

20. In a machine of the character described, the combination of means for supporting a can with a label applied thereto and the edge of the label projecting beyond one end of the can, a head, having a cluster of pivoted folding fingers to fold said projecting edge of the label over the end of the can, said fingers being normally positioned at an angle to the plane of the can end and out of contact therewith, a centering device movably mounted on the head at a point within the cluster of fingers, means for moving the centering device into contact with the end of the can, and means for thereafter moving the folding fingers into contact with the projection of the labels to fold the same in contact with the can end.

21. In a machine of the character described, the combination of means for supporting a can with a label applied thereto and the edge of the label projecting beyond one end of the can, a head, having a cluster of pivoted folding fingers to fold said projecting edge of the label over the end of the can, said fingers being normally positioned at an angle to the plane of the can end and out of contact therewith, a centering device movably mounted on the head at a point within the cluster of fingers, means for moving the centering device into contact with the end of the can, and means for thereafter moving the centering device away from the end of the can and subsequently moving the folding fingers with the projecting edge of the label in folded contact with the can end.

22. In a machine of the character described, the combination of means for supporting a can with a label applied thereto and one edge of the label projecting beyond one end of the cam, a folding head, a cluster of folding fingers carried by the head, a centering device carried by the head, means for reciprocating the centering device into and out of contact with the can end, and means for moving the folding fingers to fold the projecting ends of the label into contact with the can end after the can is released by the centering device.

23. In a machine of the character described, the combination of means for supporting a can with a label applied thereto and one edge of the label projecting beyond one end of the can, a folding head, a cluster of folding fingers carried by the head, a centering device carried by the head, means for reciprocating the centering device into and out of contact with the can end, means for moving the folding fingers to fold the projecting ends of the label into contact with the can end after the can is released by the centering device, and a can clamping member to holdingly engage the can after being centered and during the folding operation.

24. In a labeling machine, the combination of opposed folding heads, a support between the heads adapted to support a can with a label applied thereto having opposite edges of the label projecting beyond the ends of the can, folding mechanism carried by the heads for said projecting edges, centering devices operatively associated with said heads for centering the can on said support, means for moving the centering devices into and out of contact with the can, and a can clamp movable into and out of contact with the can, and said clamp being movable into contact with the can after the centering operation.

25. In a machine of the character described, a can support, a rotatable head, folding mechanism carried by the head, a supporting frame, the head having a slidable connection with the supporting frame, means for reciprocating the head, a yieldable contact member on said frame to be engaged by the head in one of its movements, and gradually interrupting the movement thereof.

26. In a machine of the character described, the combination of a head having label folding mechanism, a supporting shaft for the head, a drive shaft, a driven shaft, sprockets on the drive and driven shafts, a chain connection between the sprockets, and a yieldable drive between said driven shaft and the supporting shaft for rotating the latter.

27. In a machine of the character described, the combination of a head having label folding mechanism, a supporting shaft for the head, a drive shaft, a driven shaft, sprockets on the drive and driven shafts, a chain connection between the sprockets, an intermittently operable yieldable direct friction drive between said driven shaft and the supporting shaft for rotating the latter periodically, and a drive connection between said driven shaft and supporting shaft for reciprocating the head.

28. In a machine of the character described, the combination of a head having label folding mechanism, a supporting shaft for the head, a drive shaft, a driven shaft, sprockets on the drive and driven shafts, a chain connection between the sprockets, an operative drive connection between said driven shaft and supporting shaft, a can support, and a presser member coöperating with the can support to clamp a can in operative position relative to said head and against rotation, said presser member having driving connection with said driven shaft.

29. In a machine of the character described, the combination of a head having label folding mechanism, a supporting shaft for the head, a drive shaft, a driven shaft, sprockets on the drive and driven shafts, a chain connection between the sprockets, an operative drive connection between said driven shaft and supporting shaft, a can support, a presser member coöperating with the can support to clamp a can in operative position relative to said head, and a cam on the shaft for actuating said presser member.

30. In a machine of the character described, the combination of a head, folding fingers carried by the head, a rotatable cam member having a plurality of cam surfaces, and cam engaging members operatively associated with the head and engaging said cam surfaces to reciprocate the head and actuate said fingers.

31. In a machine of the character described, the combination of a head, folding fingers carried by the head, a rotatable cam member having a plurality of cam surfaces, and cam engaging members operatively associated with the head and engaging said cam surfaces to reciprocate the head and actuate said fingers, a rotatable shaft support for the cam member, and driving connection between the shaft support and head to rotate the latter.

32. In a machine of the character described, the combination of a head, folding fingers carried by the head, a rotatable cam member having a plurality of cam surfaces, and cam engaging members operatively associated with the head and engaging said cam surfaces to reciprocate the head and actuate said fingers, a can support and a movable centering device to engage a can on said support, said centering device having actuating means operatively associated with said cam member.

33. In a machine of the character described, the combination of opposed folding heads having label folding fingers, rotatable cam members one for each head, said cam members having a plurality of cam surfaces, and means operatively associated with the heads and with said cam surfaces to reciprocate the heads and actuate said fingers, a can support, reciprocating centering devices, and means engaging one of said cam surfaces of the cam members to actuate said centering devices.

34. In a labeling machine, a support for cans having labels applied thereto with edges projecting beyond the ends of the can, opposed folding heads having means to fold said projecting edges over the ends of the can, a cam member, can centering devices, means for moving the heads toward and from each other, means for moving said centering devices toward and from each other, both of said means being actuated by said cam member.

35. In a machine of the character described, the combination of a can support, folding heads having means to fold projecting edges of a label over the ends of the can on said support, a rotatable member having a cam surface, can centering devices to engage a can on said support arranged forwardly of said heads, means for reciprocating the heads, means for reciprocating the centering devices, both of said means having actuating means engaging said cam surface.

36. In a machine of the character described, the combination of oppositely disposed rotatable folding heads, and means movable between the heads for feeding cans to and from the heads, said means comprising a reel having peripheral can receiving grooves or pockets, and means independent of the reel movable into contact with the cans to prevent the same from rotating during the rotation of said heads.

37. In a machine of the character described, the combination of oppositely disposed rotatable folding heads, and means movable between the heads for feeding cans to and from the heads, said means comprising a reel having peripheral can receiving grooves or pockets, means for intermittently feeding said reel whereby to successively register said grooves with the heads, and means common to each groove of the reel for clamping the cans against rotation during the interrupted movement of the reel.

38. In a machine of the character described, the combination of oppositely disposed rotatable folding heads, and means movable between the heads for feeding cans to and from the heads, said means comprising a reel having peripheral can receiving grooves or pockets, and means for intermittently feeding said reel whereby to successively register said grooves with the heads, and a single movable presser foot automatically operable and adapted to successively engage the periphery of the cans and clamp the same immovably against the wall of the pocket during the folding operation.

39. In a machine of the character described, the combination of oppositely disposed rotatable folding heads, and means movable between the heads for feeding cans to and from the heads, said means comprising a reel having peripheral can receiving grooves or pockets, and means for intermittently feeding said reel whereby to successively register said grooves with the heads, and automatically operable can clamping means common to all of said pockets coöperating with the wall of said grooves to retain a can in position against rotation during the folding operation.

40. In a machine of the character described, the combination of oppositely disposed rotatable folding heads having shafts mounted on stationary supports, a rotatable reel having peripheral can receiving pockets, and a rotatable support for said reel below the heads and extending in substantial vertical alinement with the head shafts, means for intermittently interrupting the rotation of said reel, and reciprocating means acting as the reel is stopped to clamp a can in the groove against rotation during the folding operation of the heads.

41. In a machine of the character described, the combination of folding means for folding projecting edges of the label over the end of a can, a rotatable reel having a circumferential series of can receiving parts, means for rotating the reel a predetermined distance to successively register the can receiving parts with said folding means, said means comprising a supporting shaft, a ratchet disk thereon, and a cam actuated pawl to engage the teeth of said disk.

42. In a machine of the character described, the combination of a folding head for projecting labels on the can, a rotatable reel having a circumferential series of can receiving pockets adapted to successively register with said folding head, means for rotating the reel a predetermined distance comprising a supporting shaft, a ratchet disk thereon, a cam actuated pawl to engage the teeth of said disk, and a releasable locking pawl for the disk.

43. In a machine of the character described, the combination of a folding head, a rotatable reel having a circumferential series of can receiving parts, adapted to successively move into registration with the folding head, means for rotating the reel a predetermined distance comprising a supporting shaft, a ratchet disk thereon, a pawl to engage the ratchet teeth, a rock arm support for the pawl, and cam actuated means for the rock arm.

44. In a machine of the character described, the combination of a folding head, a rotatable reel having a circumferential series of cam receiving parts, means for rotating the reel a predetermined distance to register the can receiving parts with the head, comprising a supporting shaft, a ratchet disk thereon, a pawl to engage the ratchet teeth, a rock arm support for the pawl, cam actuated means for the rock arm, and brake means operatively associated with the reel.

45. In a machine of the character described, the combination of opposed folding heads a rotatable reel movable between the heads and having a circumferential series of can receiving parts, means for rotating the reel a predetermined distance whereby the reel will successively register the cans in said receiving parts with the heads, said means comprising a supporting shaft, a ratchet disk thereon, a pawl to engage the ratchet teeth, a rock arm support for the pawl, a locking pawl to engage the disk, said locking pawl being moved out of locking position by one of the movements of the rock arm.

46. In a machine of the character described, the combination of opposed heads having folding means to fold projecting edges of a label over the ends of a can, a rotatable reel having can supporting parts arranged between the heads, and means for intermittently rotating said reel for bringing said parts into operative position relative to the head comprising a shaft support for the reel, a rotatable cam surface, a rock arm having means to engage the cam surface, a ratchet disk on said shaft, a pawl to engage said disk, a rock arm support for the pawl, and connection between said rock arms, a locking pawl for the disk, and automatically releasable means for the locking pawl.

47. In a machine of the character described, the combination of a folding head, a rotatable can support to position a labeled can relative to said head, a rotatable shaft, operative connection between the shaft and head to rotate the same, a cam member mounted on said shaft, a supporting shaft for the can support and connection between said cam member and can support shaft for rotating the latter.

48. In a machine of the character described, the combination of a folding head, a rotatable can support to position a labeled can relative to said head, a rotatable shaft, operative connection between the shaft and head to rotate the same, an operative connection between said shaft and the head to reciprocate the same, a cam member mounted on said shaft, a supporting shaft for the can support and connection between said cam member and can support shaft for intermittently rotating the latter.

49. In a machine of the character described, the combination of a support for a can having applied thereto a label with edges of the label projecting beyond the ends of the can, folding heads one at each side of the can support, and a vertically reciprocating presser member coöperating with the can support to maintain the can in fixed position during the operation of said folding heads.

50. In a machine of the character described, the combination of a support for a can having applied thereto a label with edges of the label projecting beyond the ends of the can, folding heads one at each side of the can support, and a cam actuated vertically reciprocating presser member coöperating with the can support to maintain the can in fixed position during the operation of said folding heads.

51. In a machine of the character described, the combination of a support for a can having applied thereto a label with edges of the label projecting beyond the ends of the can, folding heads one at each side of the can support, means for periodically moving the can support, an automatically movable presser foot coöperating with said can support and governed by the movement thereof to maintain the can in fixed position thereon during the operation of the folding mechanism, and a yieldable support for the presser foot.

52. In a machine of the character described, the combination of a support for a can having applied thereto a label with edges of the label projecting beyond the ends of the can, folding heads one at each side of the can support, a movable presser foot coöperating with said can support to maintain the can in fixed position thereon during the operation of the folding mechanism, a reciprocating support for the presser foot and a movable connection between said support and presser foot permitting the latter to properly seat on the can.

53. In a machine of the character described, the combination of a support for a can having applied thereto a label with edges of the label projecting beyond the ends of the can, folding heads one at each side of the can support, a movable presser foot coöperating with said can support to maintain the can in fixed position thereon during the operation of the folding mechanism, a support for the presser foot, a roller bearing carried by the support, a rotatable cam to engage said roller bearing, and spring means for maintaining the roller bearing in contact with the cam whereby the presser foot is moved toward or from the can.

54. In a machine of the character described, means for supporting a can having applied thereto a label with edges projecting beyond the ends of the can, oppositely disposed heads one at each side of said support, folding mechanism carried by the heads, a rotatable shaft above the heads, means carried by the shaft to actuate the folding mechanism, and a can engaging presser member connected with said shaft and operating prior to the folding operation to holdingly engage the can on the support, and means for simultaneously rotating the can supporting means and moving the presser member out of holding contact with the can.

55. In a machine of the character described, the combination of a can carrier adapted to loosely support a can having applied thereto a label with edges of the label projecting beyond the ends of the can, folding mechanism arranged at opposite sides of the carrier to engage said projecting edges of the label and fold the same, centering devices arranged in front of the carrier to engage the can, and auxiliary centering devices in substantial alinement with the heads to engage the can immediately prior to the operation of the latter.

56. In a machine of the character described, the combination of a rotatable reel having a circumferential series of segmental grooves forming can pockets to receive cans with a label applied thereto and edges of the label projecting beyond the ends of the can, folding heads for said projecting edges of the label, means for rotating the reel, means for periodically interrupting the rotation of the reel for registering the cans with said folding heads, and means forwardly of the reel to engage the cans at a point within the projecting edges of the label and properly center the same on the reel while the same is at rest.

57. In a machine of the character described, the combination of means for supporting a can having applied thereto a label with edges of the label projecting beyond the ends of the can, folding mechanism for said projecting edges, and a discharge chute having means to yieldably engage the folded portion of said labels and press the folds flat against the can.

58. In a machine of the character described, the combination of means for supporting a can having applied thereto a label with edges of the label projecting beyond the ends of the can, folding mechanism for said projecting edges, means for discharging the labeled cans from said support, and oppositely disposed side rails for the cans associated with said discharge means said rails having a relatively narrow engaging surface to frictionally engage the folds of the label and maintain the folded condition thereof.

59. In a machine of the character described, the combination of means for supporting a can having applied thereto a label with edges of the label projecting beyond the ends of the can, folding mechanism for said projecting edges, and means to yieldably frictionally engage the folded portions of the label after said folding operation to further crease the folds.

60. In a machine of the character described, the combination of means for supporting a can having applied thereto, a label with edges of the label projecting beyond the ends of the can, folding mechanism for said projecting edges, a discharge chute for the cans, and opposed rods on the chute to engage and crease the folded portions of the labels on the cans during the discharge movement.

61. In a machine of the character described, the combination of means for supporting a can having applied thereto, a label with edges of the label projecting beyond the ends of the can folding mechanism for said projecting edges, a discharge chute for the cans, and opposed guides on the chute having rounded engaging surfaces to engage the folded portions of the labels on the cans at a point beyond the center of the cans during the discharge movement, one of said guides being yieldable.

62. In a machine of the character described, the combination of means for supporting a can having applied thereto, a label with edges of the label projecting beyond the ends of the can, folding mechanism for said projecting edges, and a discharge chute for the labeled cans having guide bars to engage the ends of the can, said guide bars tapering toward one another toward the discharge end of the chute, whereby the folds of the label are ironed by gradually increasing frictional pressure thereagainst.

63. In a machine of the character described, the combination of means for supporting a can having applied thereto, a label with edges of the label projecting beyond the ends of the can, folding mechanism for said projecting edges, and a discharge chute for the labeled cans having guide bars to engage the ends of the can, said guide bars tapering toward one another toward the discharge end of the chute, whereby the folds are subjected to gradually increasing frictional pressure, and said bars being yieldable relative to one another.

64. In a machine of the character described, the combination of means for supporting a can having applied thereto a label with edges of the label projecting beyond the ends of the can, folding mechanism for said projecting edges, and a discharge chute for the labeled cans having guide bars to engage the ends of the can, said guide bars tapering toward one another toward the discharge end of the chute, whereby the folds of the label are subjected to gradually increasing frictional pressure, and means for adjustably supporting said chute in position.

65. In a machine of the character described, the combination of opposed folding heads, a can carrier movable between the heads, a can inlet runway to deliver cans directly to the carrier, and a discharge runway adapted to receive cans directly from said carrier, the said carrier constituting a rest for the cans during the folding operation, and a periodically reciprocating can presser member coöperating with the carrier and timed with the movement thereof to maintain the cans stationary during the folding operation.

66. In a machine of the character described, the combination of opposed folding heads, a can inlet runway, a discharge runway, and a rotatable can carrier reel adapted to deliver the cans from the inlet runway into operative relation to the folding head and to discharge the cans on to said discharge runway, said inlet runway having a can receiving pocket adjacent the end thereof, and said carrier reel having means to pick up the can from said pocket.

67. In a machine of the character described, the combination of opposed folding heads mounted on a stationary support, a can carrier reel, means for reciprocating the heads into and out of folding position, and means mounted on the head and adapted in the movement of the latter to contact with the cans at a point within the projecting edges of the labels mounted on the cans, for centering the can on said reel.

68. In a machine of the character described, the combination of means for applying labels to cans with edges of the labels projecting beyond the ends of the cans, a can support folding mechanism to fold the projecting edges over the ends of the cans, and means mounted upon said folding mechanism for engaging the ends of the can at a point within the projecting edges of the labels to center the cans on the support during the folding operation.

69. In a machine of the character described, the combination of means for applying labels to cans, with edges of the label projecting beyond the edges of the can, opposed folding heads having folding mechanism for said projecting edges, and centering means mounted on the heads adapted to engage the ends of the can at a point within the projecting edges of the labels to center the cans on the support.

70. In a machine of the character described, the combination of means for applying a label to a can with edges of the label projecting beyond the ends of the cans, a can support, centering pins to engage the ends of the can at a point within the projecting edges of the labels, and cam controlled lever mechanism for operatively moving said pins whereby to engage and release the cans.

71. In a can wrapping machine, the combination of opposed folding heads, a rotatable reel having means for supporting a can with an applied label, the edges of which project beyond the ends of the can, means for rotating the reel whereby to position the label applied can between the heads, means for rendering the last mentioned means inoperative at stated intervals, yieldable means operatively associated with the reel for resisting rotation thereof when said means is rendered inoperative, and can presser means coöperating with the reel for rendering the can stationary during the operation of the folding heads and while the reel is in stationary position.

72. In a machine of the character described, the combination of label applying mechanism for applying labels to cans with edges of the labels projecting beyond the ends of the cans, movable folding mechanism adapted to engage said projecting edges of the label and fold the same into contact with ends of the can, and opposed centering pins arranged forwardly of the folding mechanism, said pins being adapted to engage the cans centrally of the ends thereof, upright supports connected to said pins, and actuating means interposed between said upright supports for simultaneously moving the same into and out of contact with the ends of the can.

In testimony whereof we hereunto affix our signatures in the presence of two witnesses.

FREDERICK H. KNAPP.
HAYWOOD G. DEWEY.

Witnesses:
A. M. VAN DOREN,
MARY E. KNAPP.